(12) United States Patent
Hu et al.

(10) Patent No.: US 11,886,103 B2
(45) Date of Patent: Jan. 30, 2024

(54) PROJECTION SCREEN

(71) Applicant: APPOTRONICS CORPORATION LIMITED, Guangdong (CN)

(72) Inventors: Fei Hu, Shenzhen (CN); Shijie Li, Shenzhen (CN); Lin Wang, Shenzhen (CN); Yi Li, Shenzhen (CN)

(73) Assignee: APPOTRONICS CORPORATION LIMITED, Guangdong (CN)

( * ) Notice: Subject to any disclaimer, the term of this patent is extended or adjusted under 35 U.S.C. 154(b) by 0 days.

(21) Appl. No.: 17/771,292

(22) PCT Filed: Oct. 24, 2020

(86) PCT No.: PCT/CN2020/123459
§ 371 (c)(1),
(2) Date: Apr. 22, 2022

(87) PCT Pub. No.: WO2021/078289
PCT Pub. Date: Apr. 29, 2021

(65) Prior Publication Data
US 2022/0373875 A1   Nov. 24, 2022

(30) Foreign Application Priority Data
Oct. 24, 2019   (CN) .......................... 201911017321.1

(51) Int. Cl.
*G03B 21/60* (2014.01)
*G02B 13/16* (2006.01)
(Continued)

(52) U.S. Cl.
CPC ............. *G03B 21/60* (2013.01); *G02B 13/10* (2013.01); *G02B 13/16* (2013.01); *G02B 17/045* (2013.01); *G02B 27/18* (2013.01); *G03B 3/02* (2013.01)

(58) Field of Classification Search
CPC .......... G03B 21/60; G03B 3/02; G02B 13/10; G02B 13/16; G02B 17/045; G02B 27/18
(Continued)

(56) References Cited

U.S. PATENT DOCUMENTS

| 7,646,536 B2 * | 1/2010 | Fujita | ..................... G03B 21/60 |
| | | | 359/742 |
| 2006/0226583 A1 * | 10/2006 | Marushin | ............. G02B 5/0278 |
| | | | 264/553 |

(Continued)

FOREIGN PATENT DOCUMENTS

| CN | 101539716 | 9/2009 |
| CN | 107290921 | 10/2017 |

(Continued)

OTHER PUBLICATIONS

International Search Report issued in corresponding International Application PCT/CN2020/123459, dated Feb. 1, 2021.

*Primary Examiner* — Stephanie E Bloss
*Assistant Examiner* — Kevin C Butler
(74) *Attorney, Agent, or Firm* — Burris Law, PLLC (57) ABSTRACT

The projection screen includes a reflective layer and a light-absorbing layer, where the reflective layer is configured to receive and reflect projection light, and the light-absorbing layer is arranged on the reflective layer; the light-absorbing layer includes a plurality of irregularly arranged light-absorbing members; and the light-absorbing members are configured to absorb at least a part of the projection light, so as to make a brightness of a projected image uniform.

16 Claims, 7 Drawing Sheets

(51) Int. Cl.
    *G02B 13/10*     (2006.01)
    *G02B 17/04*     (2006.01)
    *G02B 27/18*     (2006.01)
    *G03B 3/02*     (2021.01)

(58) Field of Classification Search
    USPC ........................................................ 359/443
    See application file for complete search history.

(56) References Cited

U.S. PATENT DOCUMENTS

| | | | |
|---|---|---|---|
| 2008/0297895 A1* | 12/2008 | Fujita | G03B 21/60 |
| | | | 359/459 |
| 2009/0231696 A1* | 9/2009 | Shinbo | G03B 21/602 |
| | | | 359/459 |
| 2020/0401034 A1* | 12/2020 | Wang | G03B 21/60 |
| 2022/0221780 A1* | 7/2022 | Li | G02B 5/0263 |
| 2022/0373875 A1* | 11/2022 | Hu | G03B 21/60 |

FOREIGN PATENT DOCUMENTS

| | | | | |
|---|---|---|---|---|
| CN | 107290921 A | * | 10/2017 | |
| CN | 206946185 | | 1/2018 | |
| CN | 206946185 U | * | 1/2018 | |
| CN | 110244508 | | 9/2019 | |
| CN | 110244508 A | * | 9/2019 | ............. G02B 5/003 |
| CN | 110361921 | | 10/2019 | |
| CN | 110361921 A | * | 10/2019 | ............. G03B 21/60 |
| JP | 2006084586 A | * | 3/2006 | |
| JP | 2010197565 | | 9/2010 | |
| JP | 2010197565 A | * | 9/2010 | |
| JP | 2010197956 | | 9/2010 | |
| JP | 2010197956 A | * | 9/2010 | |
| JP | 5298585 B2 | * | 9/2013 | ............. G03B 21/60 |
| WO | WO-2019024367 A1 | * | 2/2019 | ............. G03B 21/60 |
| WO | WO-2021078289 A1 | * | 4/2021 | ............. G03B 21/60 |

* cited by examiner

PROJECTION SCREEN

CROSS-REFERENCE TO RELATED APPLICATIONS

The present application is a national phase application of International Application No. PCT/CN2020/123459, filed on Oct. 24, 2020, which claims priority to and the benefit of Chinese Patent Application No. 201911017321.1, filed on Oct. 24, 2019. The disclosures of the above applications are incorporated herein by reference in their entirety.

FIELD

The present disclosure relates to the technical field of projection, and in particular to a projection screen.

BACKGROUND

The statements in this section merely provide background information related to the present disclosure and may not constitute prior art.

Generally, the projection device emits projection light, and the projection screen receives the projection light and reflects or transmits the projection light to the user's view, thereby presenting an image. Compared with display screens such as light-emitting diode (LED) screens and liquid crystal display (LCD) screens, the projection screen can realize larger-sized images and provide better viewing effects.

Long-term research and development has shown that when the projection device emits projection light onto the projection screen at different angles, and the brightness of the projected image is not uniform. Moreover, when the user views the projected image, both the projection light and ambient light can enter the user's field of view (FOV). The ambient light acts as basal light to increase the minimum brightness of the projected image. However, when the brightness of the ambient light is too strong, the projected image will present gray and white. In addition, the color of the ambient light will also affect the color of the projected image, thereby affecting the viewing experience.

SUMMARY

This section provides a general summary of the disclosure and is not a comprehensive disclosure of its full scope or all of its features.

The present disclosure provides a projection screen, which solves the technical problems that the projection screen in the prior art has non-uniform brightness and is easily affected by ambient light.

To solve the above technical problems, the present disclosure adopts the following technical solution.

A projection screen includes a reflective layer and a light-absorbing layer. The reflective layer is configured to receive and reflect projection light. The light-absorbing layer is arranged on the reflective layer and includes a plurality of irregularly arranged light-absorbing members. The light-absorbing members are configured to absorb at least a part of the projection light, so as to make a brightness of a projected image uniform.

In the present disclosure, the projection screen is provided with a light-absorbing layer. The light-absorbing layer includes a plurality of irregularly arranged light-absorbing members for absorbing at least a part of the projection light, so as to make the projected image uniform in brightness and less likely to have Moire fringes. Meanwhile, the light-absorbing members can shield at least a part of the ambient light, thereby reducing the influence of the ambient light on the projected image, improving the ambient contrast ratio, and avoiding affecting the gain of the projection screen.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

To describe the technical solutions in the embodiments of the present disclosure more clearly, the drawings required for describing the embodiments are briefly described below. Apparently, the drawings in the following description show merely some embodiments of the present disclosure, and those of ordinary skill in the art may still derive other drawings from these drawings without creative efforts.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The technical solutions in the embodiments of the present disclosure will be described below clearly and completely with reference to the drawings in the embodiments of the present disclosure. Apparently, the described embodiments are merely some rather than all of the embodiments of the present disclosure. All other embodiments obtained by those of ordinary skill in the art based on the embodiments of the present disclosure without creative efforts should fall within the protection scope of the present disclosure.

The terms such as "first" and "second" used herein are only for the purpose of description and should not be construed as indicating or implying relative importance, or implicitly indicating a quantity of indicated technical features. In the description of the present disclosure, "a plurality of" means at least two, for example, two or three, unless otherwise clearly and specifically limited. In addition, the terms "include", "have" and any variations thereof are intended to cover non-exclusive inclusions. For example, a process, method, system, product or device that includes a series of steps or units is not limited to the listed steps or units. On the contrary, optionally, it also includes steps or units that are not listed, or optionally also includes other steps or units inherent to the process, method, product or device. The term "and/or" merely describes associations between associated objects, and it indicates three types of relationships. For example, A and/or B may indicate that A alone, A and B, or B alone. In addition, the character "/" in this specification generally indicates that the associated objects are in an "or" relationship.

Figure 1:
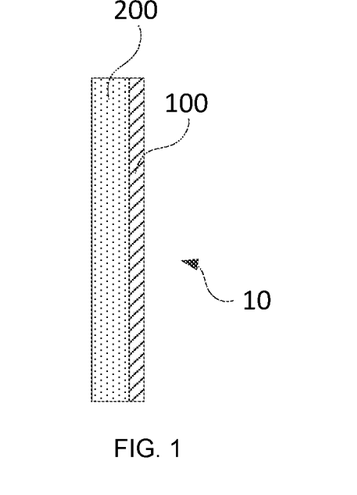
FIG. 1 is a structural diagram of a projection screen according to a first embodiment of the present disclosure.
Figure 2:
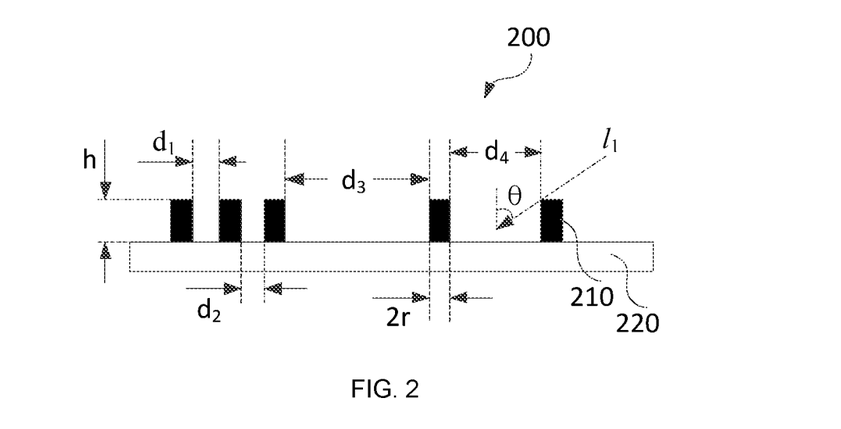
FIG. 2 is a structural diagram of a light-absorbing layer of the projection screen according to the first embodiment of the present disclosure.

Referring to FIGS. 1 and 2, in a first embodiment of the present disclosure, a projection screen 10 includes a reflective layer 100 and a light-absorbing layer 200. The reflective layer 100 is configured to receive and reflect projection light, and the light-absorbing layer 200 is arranged on the reflective layer 100. The light-absorbing layer 200 includes a plurality of irregularly arranged light-absorbing members 210. The light-absorbing members 210 are configured to absorb at least a part of the projection light, so as to make a brightness of a projected image uniform.

In the embodiment of the present disclosure, the light-absorbing layer 200 is arranged on the projection screen 10. The light-absorbing layer 200 includes a plurality of irregularly arranged light-absorbing members 210 for absorbing at least a part of the projection light, so as to make the projected image uniform in brightness and less likely to have Moire fringes. Meanwhile, the light-absorbing members 210 can shield at least a part of the ambient light, thereby reducing the influence of the ambient light on the projected image, improving the ambient contrast ratio, and avoiding affecting the gain of the projection screen 10.

In this embodiment, the light-absorbing members 210 may be black light-absorbing members.

In this embodiment, the light-absorbing layer 200 further includes a substrate 220. The substrate 220 is arranged on the reflective layer 100, and the light-absorbing members 210 are arranged on the substrate 220.

Figure 3:
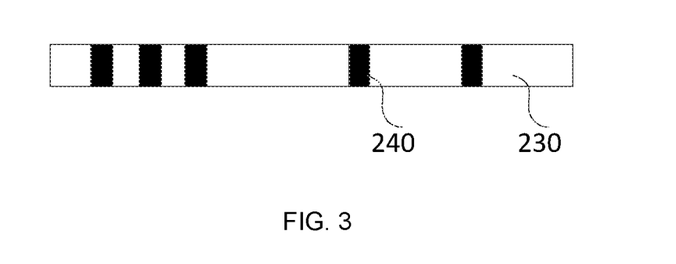
FIG. 3 is a structural diagram of a light-absorbing layer of the projection screen according to another embodiment of the present disclosure.

Referring to FIG. 3, in other embodiments, the light-absorbing members 240 may also be embedded in the substrate 230, which is not limited herein.

Compared with the light-absorbing members 240 embedded in the substrate 230, in this embodiment, the light-absorbing members 210 are arranged on the substrate 220, and this arrangement can prevent ambient light from being refracted by the substrate 220, and avoid reducing the ambient contrast ratio of the projection screen 10.

Figure 4:
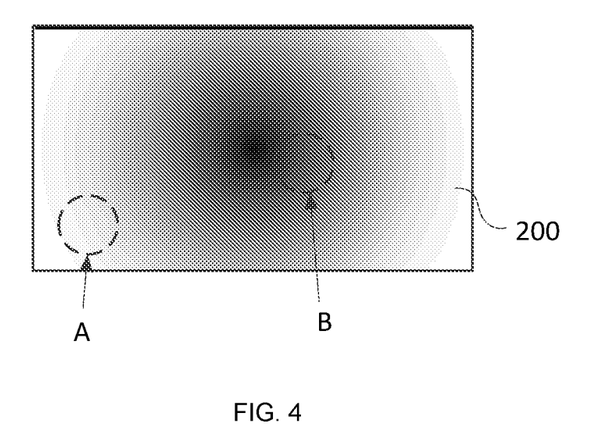
FIG. 4 is a structural diagram of the light-absorbing layer of the projection screen according to the first embodiment of the present disclosure.
Figure 5:
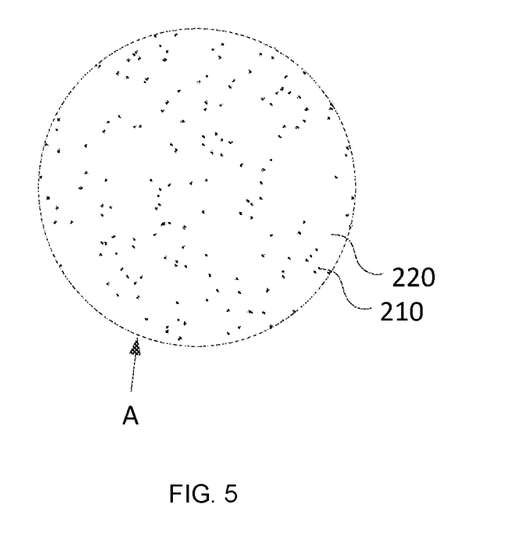
FIG. 5 is a detail of an area A shown in FIG. 4.
Figure 6:
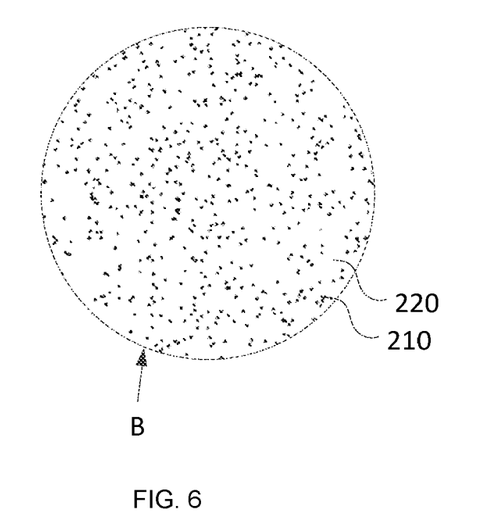
FIG. 6 is a detail of an area B shown in FIG. 4.

Referring to FIGS. 1, 2 and FIGS. 4 to 6, the projection screen 10 includes a first area (not shown in the figures) and a second area (not shown in the figures) positioned around the first area. The first area corresponds to an area with a brightness value greater than or equal to a brightness threshold in an original projected image projected by the projection device. The second area corresponds to an area with a brightness value less than the brightness threshold in the original projected image. An arrangement density of the light-absorbing members 210 arranged in the first area is greater than an arrangement density of the light-absorbing members 210 arranged in the second area. For example, in this embodiment, an area A shown in FIGS. 4 and 5 is located in the second area, and the arrangement density of the light-absorbing members 210 arranged in the area A is relatively small. An area B shown in FIGS. 4 and 6 is located in the first area, and the density of the light-absorbing members 210 arranged in the area B is relatively large.

The original projected image is an image presented on the projection screen 10 without the light-absorbing layer 200. In this embodiment, a light meter may be provided to detect the brightness of the original projected image.

Figure 7:
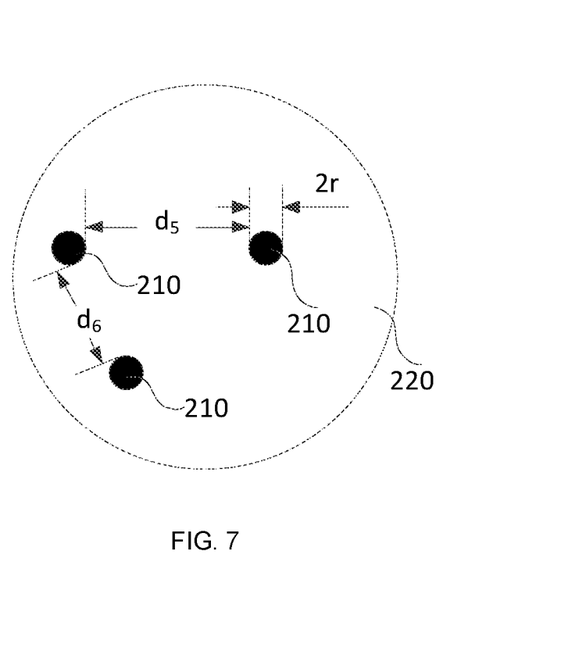
FIG. 7 is a detail of the light-absorbing layer shown in FIG. 4.

Referring to FIG. 7, in this embodiment, a cross sectional area of the light-absorbing member 210 along a direction parallel to a surface of the projection screen 10 is $S_1$, and a single-pixel area of the projected image (not shown in the figure) is $S_2$, where $S_1 < 1/4 S_2$, for example, $S_1 = 1/5 S_2$, $S_1 = 1/7 S_2$ or $S_1 = 1/10 S_2$.

In this embodiment, a cross section of the light-absorbing member 210 along the direction parallel to the surface of the projection screen 10 is a circular cross section with a radius of r. Therefore, in this embodiment, $S_1 = 7 \ast r^2$. The radius is $r < 0.25$ mm, for example, r may be 0.1 mm, 0.2 mm or 0.22 mm, etc.

Since a plurality of light-absorbing members 210 may be arranged in an area corresponding to a single pixel of the projection image, $S_1$ is set to be less than $1/4 S_2$ and/or r is set to be less than 0.25 mm. In this way, the light-absorbing members 210 will not affect the display of a single pixel when absorbing the projection light.

In other embodiments, the cross section of the light-absorbing member 210 along the direction parallel to the surface of the projection screen 10 may also be a polygon, such as an ellipse, a rectangle or a triangle, which is not limited herein.

Referring to FIGS. 1 and 2, in this embodiment, a height of the light-absorbing member 210 along a direction perpendicular to the surface of the projection screen 10 is h, 0.01 mm<h<10 mm. For example, h may be 0.5 mm, 2 mm, 7 mm or the like. Since ambient light irradiates on the projection screen 10 with a large incident angle, when the height h of the light-absorbing member 210 along the direction perpendicular to the surface of the projection screen 10 is increased, the incident angle θ of the light $/_1$ received by the projection screen is decreased. Meanwhile, the projection light is not all irradiated to the projection screen at an incident angle of 0°. Therefore, by setting h between 0.01 mm and 10 mm, while the light-absorbing members absorb a part of the projection light and shield at least a part of the ambient light, they can reduce the influence on the unabsorbed projection light.

Referring to FIG. 7, in this embodiment, a distance between every two adjacent light-absorbing members 210 is $d_i$, where i=1, 2, 3 . . . n. An average distance between two adjacent light-absorbing members 210 of the plurality of light-absorbing members 210 is $d_e=(d_1+d_2+\ldots+d_n)/n$, and the incident angle of the light $l_1$ received by the projection screen is $\theta=\arctan((d_e-r)/h)$. Therefore, a smaller average distance $d_e$ of the plurality of light-absorbing members 210 leads to a smaller $\theta$, more ambient light shielded by the projection screen 10, and a higher ambient contrast ratio is obtained.

In this embodiment, although the plurality of light-absorbing members 210 are irregularly arranged, the distance $d_i$ between every two adjacent light-absorbing members 210 can still be limited to a certain extent. Specifically, a dispersion coefficient of the light-absorbing members 210 is set as V, $V=w/d_e$, where $$w = \sqrt{\frac{\sum_{i=1}^{n}(d_i - d_e)^2}{n-1}},$$

$0.7<V<0.95$, thereby limiting the dispersion coefficient V within a certain range. If the dispersion coefficient V is too large, the regularity of the arrangement of the plurality of light-absorbing members 210 will be too strong, thereby generating Moire fringes. If the dispersion coefficient V is too small, the brightness of some areas on the projected image will increase or decrease sharply, thereby affecting the quality of the projected image.

Figure 8:
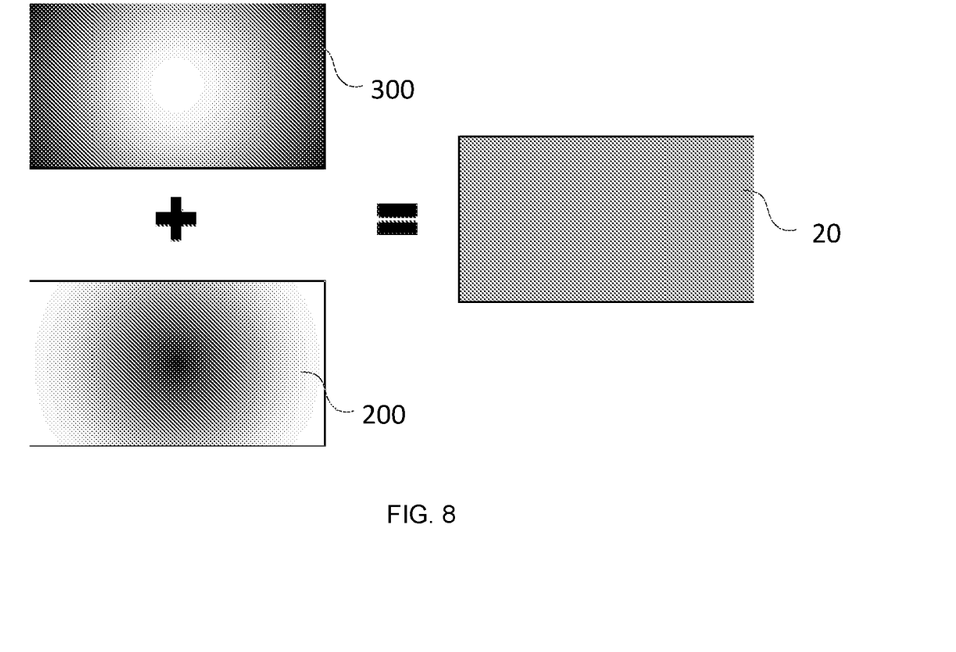
FIG. 8 is a schematic diagram of an image presented by the projection screen with the light-absorbing layer according to the first embodiment of the present disclosure.

Referring to FIG. 8, in this embodiment, when the projection device is a ceiling-mounted medium telephoto projector, a central area of the original projected image 300 is brighter, and the peripheral area is darker. Correspondingly, the central area of the light-absorbing layer 200 is the first area, and the peripheral area of the light-absorbing layer 200 is the second area. After the light-absorbing layer 200 is added, the projected image 20 has a uniform brightness and is less likely to have Moire fringes.

Figure 9:
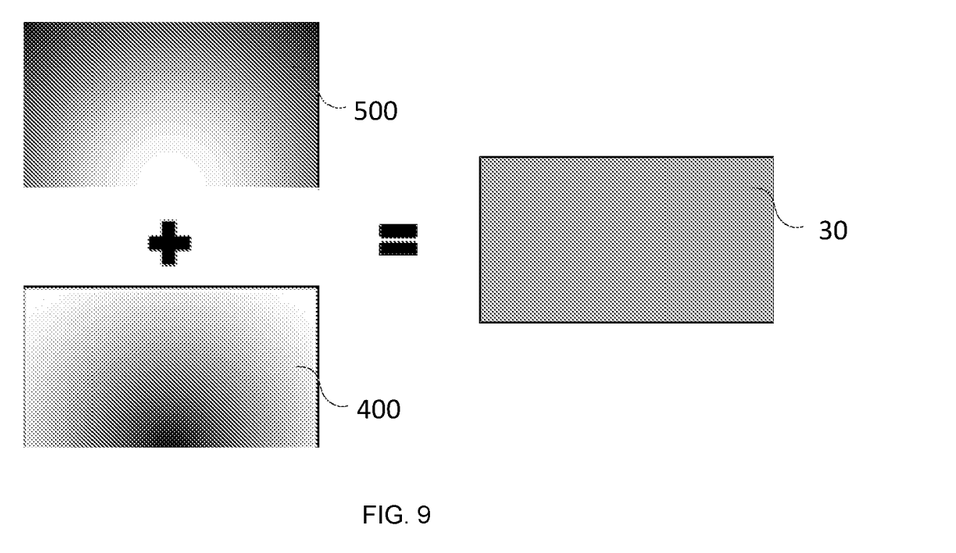
FIG. 9 is a schematic diagram of an image presented by the projection screen with the light-absorbing layer according to another embodiment of the present disclosure.

Referring to FIG. 9, in other embodiments, when the projection device is an ultra-short-throw projector, a lower central area of the original projected image 500 is brighter, and other area is darker. Correspondingly, the lower central area of the light-absorbing layer 200 is the first area, and the other area of the light-absorbing layer 200 is the second area. After the light-absorbing layer 400 is added, the projected image 30 has a uniform brightness and is less likely to have Moire fringes.

In other embodiments, the first area and the second area of the light-absorbing layer are adjustable based on the actual brighter area and darker area of the original projected image, which is not limited herein.

Figure 10:
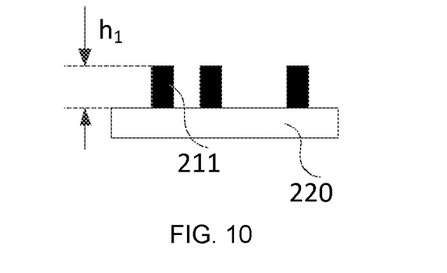
FIG. 10 is a structural diagram of a central area of the projection screen according to the first embodiment of the present disclosure.
Figure 11:
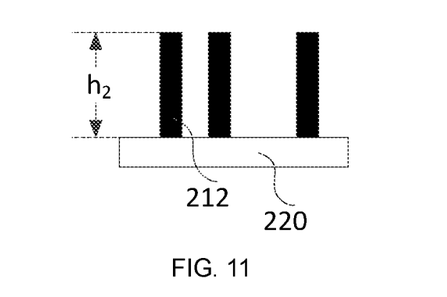
FIG. 11 is a structural diagram of an edge area of the projection screen according to the first embodiment of the present disclosure.

Referring to FIGS. 1, 10 and 11, in this embodiment, the projection screen 10 may include a central area and an edge area. The light-absorbing members may include first light-absorbing members 211 located in the central area and second light-absorbing members 212 located in the edge area. The height of the first light-absorbing members 211 along the direction perpendicular to the surface of the projection screen 10 is $h_1$, and the height of the second light-absorbing members 212 along the direction perpendicular to the surface of the projection screen 10 is $h_2$, $2h_1 \leq h_2 \leq 3h_1$. The height $h_2$ of the second light-absorbing members 212 along the direction perpendicular to the surface of the projection screen 10 is set to be between $2h_1$ and $3h_1$, so as to improve the ambient contrast ratio in the edge area.

The central area and the edge area can be defined based on a distance from a side of the screen. For example, the central area is defined as an area with a distance greater than or equal to a length threshold from the side of the screen. The edge area is defined as an area with a distance less than the length threshold from the side of the screen.

In this embodiment, the reflective layer 100 may have a reflectivity of 30%-60%, such as 30%, 45% or 60%, such that at least a part of the ambient light not absorbed by the light-absorbing layer 200 is absorbed by the reflective layer 100, thereby reducing the influence of the ambient light on the projected image. It should be noted that, the reflectivity of the reflective layer 100 may be controlled by adding a light-absorbing material such as carbon black or lamp black and a reflective material such as aluminum powder or silver powder based on a proper addition ratio, so as to realize the functions of reflecting and absorbing light at the same time.

In other embodiments, to improve the brightness of the projected image, the reflectivity of the reflective layer 100 may also be 60%-100%, such as 60%, 90% or 100%, which is not limited herein.

Figure 12:
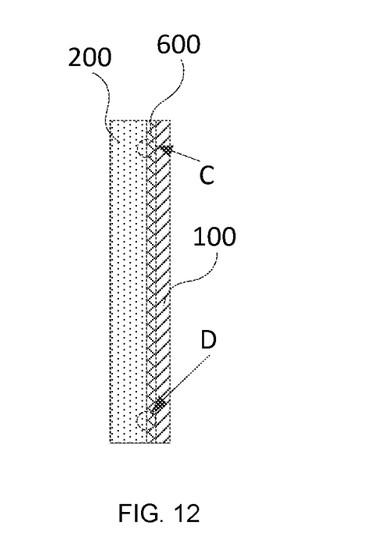
FIG. 12 is a structural diagram of a projection screen according to a second embodiment of the present disclosure.

Referring to FIG. 12, in a second embodiment of the present disclosure, the projection screen 10 includes a reflective layer 100, a light-absorbing layer 200 and a focusing layer 600. The structures of the reflective layer 100 and the light-absorbing layer 200 can be referred to those in the first embodiment of the projection screen 10 described above, and are not repeated herein. The focusing layer 600 is arranged between the light-absorbing layer 200 and the reflective layer 100 to focus the projection light.

Figure 13:
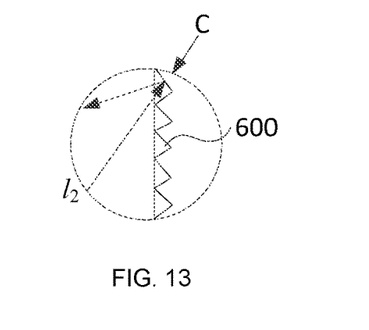
FIG. 13 is a detail of an area C shown in FIG. 12.
Figure 14:
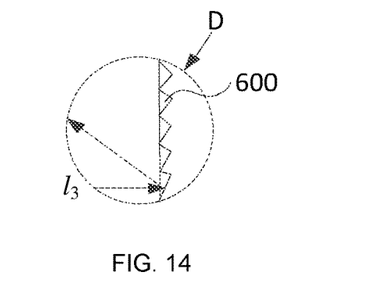
FIG. 14 is a detail of an area D shown in FIG. 12.

Referring to FIGS. 13 and 14, the focusing layer 600 may include a plurality of prism structures (not shown in the figures) having a linear Fresnel structure. The plurality of prism structures can change a reflection angle of the projection light (for example, $l_2$ and $l_3$ in the figures), so as to focus and project the light at different incident angles to the user's view. The focusing layer 600 can reduce the maximum density of the light-absorbing members 210 in the light-absorbing layer 200, thereby increasing the overall brightness of the projection screen. In other embodiments, the prism structures of the focusing layer 600 may be arranged in an annular Fresnel structure. With the prism structures having an annular Fresnel structure, the focusing layer 600 can improve the contrast ratio of the projected image, which is not repeated herein.

Figure 15:
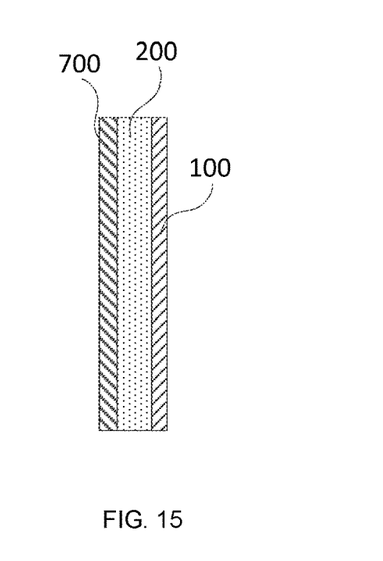
FIG. 15 is a structural diagram of a projection screen according to a third embodiment of the present disclosure.

Referring to FIG. 15, in a third embodiment of the present disclosure, the projection screen 10 includes a reflective layer 100, a light-absorbing layer 200 and a diffusion layer 700. The structures of the reflective layer 100 and the light-absorbing layer 200 can be referred to those in the first embodiment of the projection screen 10 described above, and are not repeated herein. The diffusion layer 700 is arranged on the light-absorbing layer 200 to diffuse projection light reflected by the reflective layer 100. The diffusion layer 700 may be a layered structure which diffuses by diffusion particles added into a transparent material layer, and may also be a layered structure which diffuses by microstructures formed on a surface of the transparent material layer. For example, irregularly arranged microstructures may be formed by roughening the surface of the transparent material layer, and regularly arranged microstructures may be formed by imprinting on the surface of the transparent material layer.

In this embodiment, the diffusion layer 700 may have a diffusion angle of 5-30°, for example, 5°, 22° or 30°. The diffusion layer 700 can increase the projection light reflected by the reflective layer 100, thereby increasing the viewing angle of the projected image and improving the projection effect.

Figure 16:
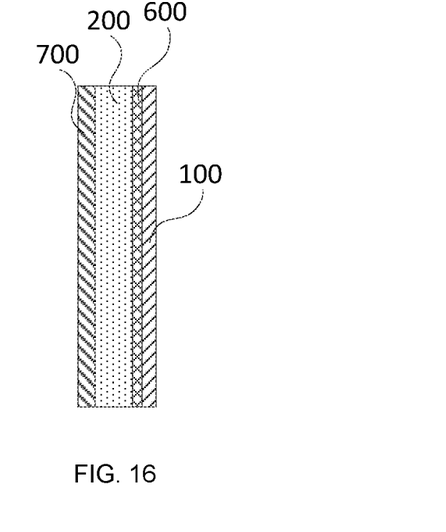
FIG. 16 is a structural diagram of a projection screen according to a fourth embodiment of the present disclosure.

Referring to FIG. 16, in a fourth embodiment of the present disclosure, the projection screen 10 includes a reflective layer 100, a light-absorbing layer 200, a focusing layer 600 and a diffusion layer 700. The structures of the reflective layer 100 and the light-absorbing layer 200 can be referred to those in the first embodiment of the projection screen 10 described above. The structure of the focusing layer 600 can be referred to that in the second embodiment of the projection screen 10 described above. The structure of the diffusion layer 700 can be referred to that in the third embodiment of the projection screen 10 described above.

In the embodiment of the present disclosure, the light-absorbing layer 200 is arranged on the projection screen 10. The light-absorbing layer 200 includes a plurality of irregularly arranged light-absorbing members 210 for absorbing at least a part of the projection light, so as to make the projected image uniform in brightness and less likely to have Moire fringes. Meanwhile, the light-absorbing members 210 can shield at least a part of the ambient light, thereby reducing the influence of the ambient light on the projected image, improving the ambient contrast ratio, and avoiding affecting the gain of the projection screen 10.

The above described are merely implementations of the present disclosure, which do not constitute a limitation on the scope of the present patent application. Any equivalent structure or equivalent process change made based on the description and drawings of the present disclosure, or direct or indirect application thereof in other related technical fields, should still fall in the protection scope of the patent of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A projection screen, comprising:
a reflective layer, configured to receive and reflect projection light; and
a light-absorbing layer, arranged on the reflective layer and comprising light-absorbing members that are irregularly arranged,
wherein the light-absorbing members are configured to absorb at least part of the projection light, and the projection screen displays to display a projected image with a uniform brightness;
wherein the light-absorbing members are arranged based on a dispersion coefficient V, and $0.7<V<0.95$.

2. The projection screen according to claim 1, wherein the light-absorbing layer further comprises a substrate arranged on the reflective layer, and the light-absorbing members are arranged on or embedded in the substrate.

3. The projection screen according to claim 1, having a first area and a second area disposed around the first area, wherein
the first area corresponds to an area with a brightness value greater than or equal to a brightness threshold of an original projected image projected by a projection device; the second area corresponds to an area with a brightness value less than the brightness threshold of the original projected image, and
an arrangement density of the light-absorbing members arranged in the first area is greater than an arrangement density of the light-absorbing members arranged in the second area.

4. The projection screen according to claim 1, wherein a cross sectional area of one of the light-absorbing members along a direction parallel to a surface of the projection screen is $S_1$, and a single-pixel area of the projected image is $S_2$, and $S_1 < 1/4 * S_2$.

5. The projection screen according to claim 1, wherein each of the light-absorbing members has a circular cross section, elliptical cross section or polygonal cross section along a direction parallel to a surface of the projection screen; wherein the circular cross section has a radius of r, and $r < 0.25$ mm.

6. The projection screen according to claim 1, wherein each of the light-absorbing members has a height of h along a direction perpendicular to a surface of the projection screen, and $0.01$ mm $< h < 10$ mm.

7. The projection screen according to claim 1, having a central area and an edge area, wherein each of the light-absorbing members located in the central area has a height of $h_1$ along a direction perpendicular to a surface of the projection screen, and one of the light-absorbing members located in the edge area has a height of $h_2$ along the direction perpendicular to the surface of the projection screen, and $2h_1 \leq h_2 \leq 3h_1$.

8. The projection screen according to claim 1, further comprising a diffusion layer arranged on the light-absorbing layer to diffuse the projection light reflected by the reflective layer.

9. The projection screen according to claim 8, wherein the diffusion layer is a transparent material layer adopted with diffusion particles.

10. The projection screen according to claim 8, wherein the diffusion layer is a transparent material layer formed with microstructures on one surface of the transparent material layer.

11. The projection screen according to claim 8, wherein the diffusion layer has a diffusion angle of 5-30°.

12. The projection screen according to claim 1, further comprising a focusing layer arranged between the light-absorbing layer and the reflective layer to focus the projection light.

13. The projection screen according to claim 12, wherein the focusing layer includes a plurality of prism structures, and the plurality of prism structures are arranged in an annular Fresnel structure.

14. The projection screen according to claim 1, wherein the light-absorbing members are black.

15. The projection screen according to claim 1, wherein the reflective layer comprises a light-absorbing material and a reflective material.

16. The projection screen according to claim 15, wherein the light-absorbing material is at least one of carbon black and lamp black; and the reflective material is at least one of aluminum powder and silver powder.

\* \* \* \* \*